Jan. 13, 1925. 1,522,519
D. E. HENNESSY
MECHANICAL LIFT ELEVATING TRUCK
Original Filed March 20, 1917   3 Sheets-Sheet 2

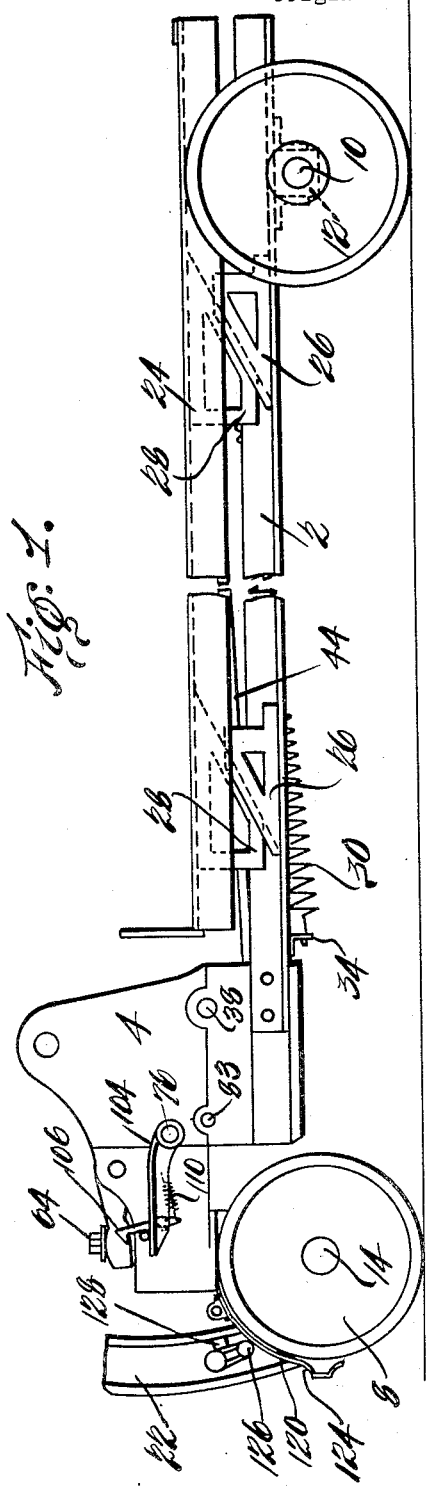

Inventor
Daniel E. Hennessy
By his Attorneys
Newell & Neal

Jan. 13, 1925.
D. E. HENNESSY
MECHANICAL LIFT ELEVATING TRUCK
Original Filed March 20, 1917 3 Sheets-Sheet 3
1,522,519
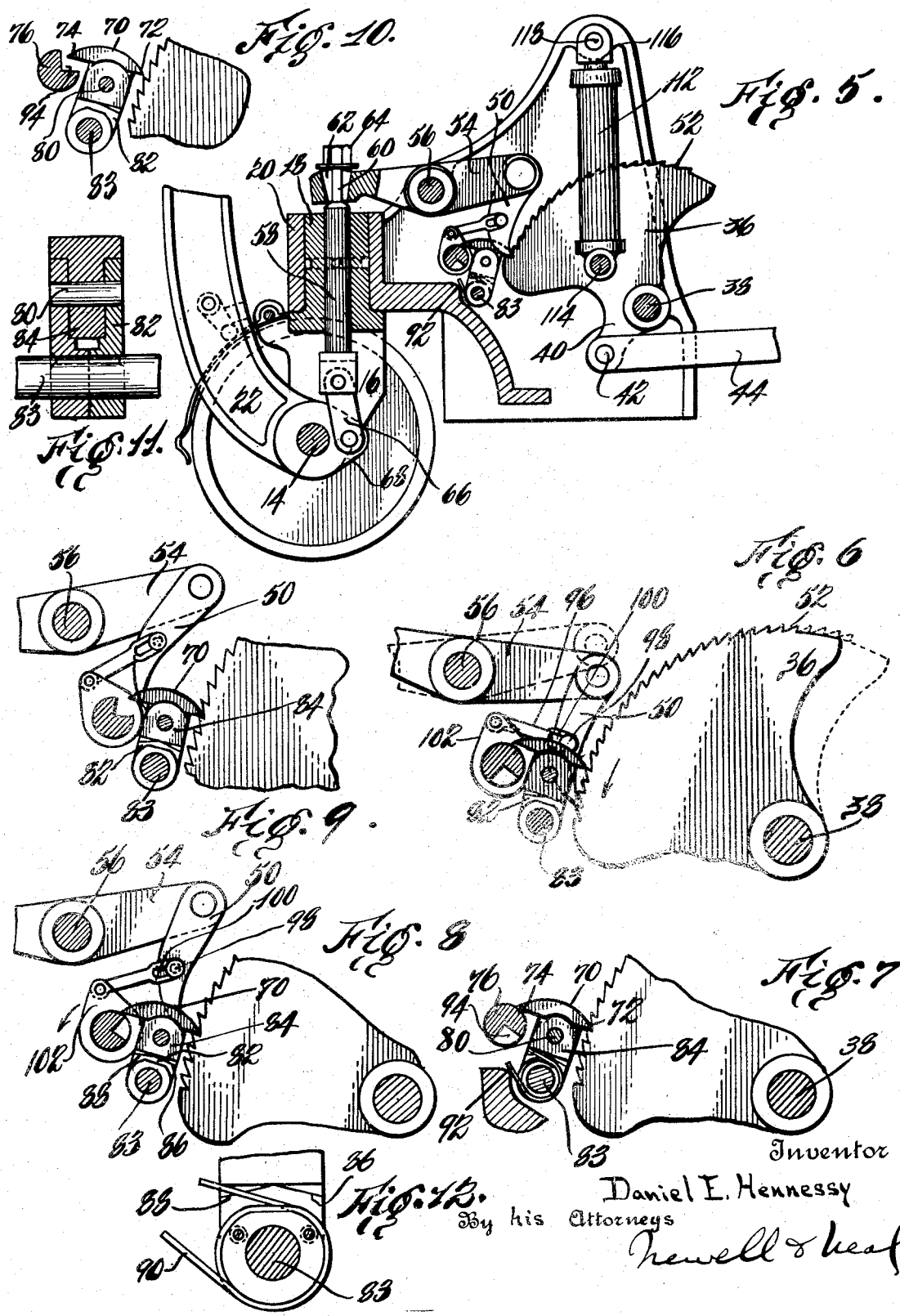
Inventor
Daniel E. Hennessy
By his Attorneys
Newell & Neal Patented Jan. 13, 1925.

1,522,519

UNITED STATES PATENT OFFICE.

DANIEL E. HENNESSY, OF HOLYOKE, MASSACHUSETTS, ASSIGNOR TO HERBERT W. COWAN, J. LEWIS WYCKOFF, AND EDWARD N. WHITE, ALL OF HOLYOKE, MASSACHUSETTS, TRUSTEES, DOING BUSINESS AS COWAN TRUCK COMPANY.

MECHANICAL-LIFT ELEVATING TRUCK.

Application filed March 20, 1917, Serial No. 156,020. Renewed June 14, 1924.

*To all whom it may concern:*

Be it known that I, DANIEL E. HENNESSY, a citizen of the United States, residing at Holyoke, Massachusetts, have invented certain new and useful Improvements in Mechanical-Lift Elevating Trucks, of which the following is a clear, full, and exact description.

This invention relates to elevating trucks and particularly to elevating trucks of the type in which the elevating mechanism is operated from a handle which is also used to steer and to pull or push the truck from place to place.

An object of the invention is to provide an improved elevating truck in which the elevation of the load-carrying frame or platform may be effected from the steering handle in a step by step manner in any steering position of the handle.

Another object of the invention is to provide a connection between the elevating mechanism and the steering handle of a truck of this type which will permit the swivelling movement of the truck handle upon the truck frame in the steering operation of the handle, without disturbance of the relative positions of the parts of the elevating mechanism which are mounted upon the truck frame, and which connection, moreover, will transmit the vertical movements of the truck handle to said elevating mechanism in any position to which said handle may be moved for steering.

The invention aims also to provide improved means for interrupting and for restoring the operative connection between the handle and the elevating mechanism.

An important feature of the invention is the provision of a single manually operated means for controlling both the interruption of the operative connection between the steering handle and the elevating mechanism of the truck and the release of the means for retaining the load-carrying platform in elevated condition, the said manually operated controlling means preferably having three operative positions, in one of which it serves to maintain the operative connection between the steering handle and the elevating mechanism, in the second of which it releases said operative connection but still maintains the load-carrying platform in elevated condition, and in the third of which positions it releases the load-carrying platform. Another important feature of the invention is the novel means for retaining the load-carrying frame or platform in elevated position and the means associated therewith for effecting easily, and without strain upon any of the parts, the release of the loaded platform, to permit its return to its lowered position.

A further important feature of the invention is the provision of means for locking the truck against movement during the load-lifting stroke of the steering handle, this means being rendered operative by said movement of the steering handle.

Other objects and important features of the invention will appear from the following description and claims when considered in connection with the accompanying drawing, in which—

Fig. 1 is a side elevation of an elevating truck embodying the invention, a part of the truck handle being broken away;

Fig. 2 is a plan view of the truck shown in Fig. 1;

Fig. 3 is a sectional plan of the front part of the truck illustrating particularly the jack mechanism through which the elevation of the load-carrying platform is effected, the section being taken on the line 3—3 of Fig. 4;

Fig. 4 is a side elevation of the front part of the truck drawn to a larger scale than the showing in Fig. 1;

Fig. 5 is a vertical section through the front part of the truck;

Figs. 6, 7, 8, 9 and 10 are diagrammatic views illustrating the different positions of the lifting and retaining pawls with respect to the segmental ratchets of the jack and with respect to the pawl controlling means;

Fig. 11 is a transverse section through one of the retaining pawls; and

Fig. 12 is a detail view showing the spring associated with the retaining pawl.

The illustrated truck comprises a horizontal frame 2 having at its forward end an upright frame or casing 4 for the jack mechanism of the truck, the frame of the truck being supported upon rear supporting wheels 6 and front steering wheels 8, the supporting wheels being attached to an axle 10 carried in bearings 12 on the frame 2.

The front steering wheels 8 are carried upon an axle 14, which extends through a forked steering wheel support 16, having a shouldered extension 18 swivelled in a vertical bearing 20 at the front of the upright frame or casing 4. Between the fork members 16 of the forked portion of the steering wheel support, the steering handle 22 is fulcrumed upon the axle 14.

The load-carrying frame or platform 24 of the truck extends substantially parallel to the frame 2, and is arranged to be elevated, with respect to said frame, in any suitable manner, the illustrated means for effecting the vertical separation of the frames 2 and 24 comprising cooperating wedges 26 and 28, carried respectively on the frames 2 and 24 and so arranged that by a rearward movement of the frame 24 with respect to the frame 2, the elevation of said frame 24 is effected. A spring 30 connected at one end to a cross bar 32 on the frame 24, and at its other end to a cross bar 34 on the frame 2, is so tensioned that it tends to maintain the frame 24 in its lowered position.

The illustrated truck is intended to handle comparatively heavy loads, and mechanism is therefore provided for effecting the elevation of the load-carrying frame or platform 24 in a step by step manner, the illustrated mechanism comprising a jack mounted in the upright frame or casing 4 at the front of the truck, and connections whereby this jack may be operated from the steering handle 22. A pair of segmental ratchets 36 are attached to a cross shaft 38, said ratchets having arms 40 extending below the cross shaft 38 and connected by a pin 42, which in turn is connected by a pair of links 44 to a pin 46 in a yoke 48 upon the cross bar 32 of the load-carrying frame or platform 24. Rocking of the segmental ratchets 36 in a counter-clockwise direction about the axis of the cross shaft 38, as viewed in the drawings, thus effects, through the connections just described, the elevation of the load-carrying frame or platform 24 upon the frame 2.

The illustrated means for effecting the rocking or turning of the segmental ratchets 36 about the axis of the cross shaft 38, comprises pawls 50 adapted to engage the ratchet teeth 52 of the segmental ratchets, there being one of these pawls arranged to cooperate with each of these ratchets, and these pawls being pivoted upon the T-shaped rear end of the lever 54, which is fulcrumed at 56 in the casing 4. At its forward end the lever 54 has a combined swivel and pin and slot connection with a rod 58 arranged to slide vertically in the line of the axis of the steering swivel 18, the reduced upper end 60 of said rod being received in a slot 62 in the lever 54 of the shape shown in Fig. 5, the slot 62 being wider at its upper end than at its lower end to provide for the rocking of the lever 54 about its fulcrum 56. A nut 64 screwed upon the upper end of the rod 58 completes the connection of the lever 54 to said rod. At its lower end the rod 58 is connected by a link 66 to an extension 68 of the steering handle 22 upon the rear side of its fulcrum 14.

When the parts are in the position shown in Fig. 5 of the drawings, rocking of the steering handle 22 about its fulcrum 14 effects a vertical reciprocation of the rod 58 through the axial center of the swivel 18, and thus transmits the rocking movement of said handle to the lever 54, which carries the pawls 50. As the handle 22 is raised, the pawls 50 will ride up over the ratchet teeth 52 of the ratchets 36, and when the handle is again depressed these pawls will engage the ratchet teeth and rock the ratchets about the axis of the cross shaft 38, thus effecting a partial elevation of the load-carrying frame or platform 24. At the end of this lifting stroke of the handle 22, one of the teeth of each of the ratchets will be engaged by one of two retaining pawls 70, now to be described.

The retaining pawls 70 are illustrated in detail in Figs. 5 to 12 inclusive of the drawings, and each comprises a head having at one end a tooth 72, and at its other end a supporting tail 74 which cooperates with a cross shaft 76, having its bearings in the sides of the frame or casing 4, to maintain the pawl in retaining position. Each of the pawls 70 is pivoted upon a cross pin 80, extending between the two sides of a pawl-carrier 82, which is fixed upon the shaft 83. From an inspection of Figs. 11 and 12 it will be noted that each of the pawls 70 has a stem 84 extending between the sides of the carrier 82, and having a squared lower end which cooperates with stop surfaces 86 and 88 upon the carrier 82, these stop surfaces permitting a limited rocking movement of the pawl 70 upon its carrier. A spring 90 surrounding the central portion of the carrier 82 and bearing at one end against a shoulder 92 on the casing 4, and at its other end against the forward corner of the lower edge of the stem 84 of the pawl 70, tends to rock said pawl toward the stop 86, and also to move both the pawl and its carrier about the axis of the shaft 83, thus tending to keep the tooth 72 in engagement with one of the ratchet teeth 52 of the ratchet 36.

As shown in Fig. 6, the rocking movement of the pawl 70 upon its carrier 82 is sufficient to permit the ratchet teeth to pass the tooth 72 of said pawl when the ratchet 36 is being moved by the pawl 50, the action of the pawl and its carrier at this time having somewhat the nature of the breaking of a toggle since the tail 74 of the pawl is resting upon the shaft 76, and thus not only does the pawl 70 turn about its pivot 80, but this pivot is forced slightly forward, thereby rocking the shaft 83. When it is desired to release the ratchet 36 to permit the lowering of the load-carrying frame or platform 24, the shaft 76 is turned until the notch or recess 94 in said shaft has been brought into position to receive the tail 74 of said pawl, in which position the pawl will no longer be supported in its retaining position but will be free to move back into the recess 94 under the action of the load, the releasing action of the pawl being facilitated by reason of the provision for a slight rocking toward the stops 86, 88, this rocking movement bringing the tooth 72 of the pawl into a different inclination to the teeth of the ratchet.

Releasing of the pawl 70 from the ratchet 52 would not alone permit the lowering of the load-carrying frame or platform 24, since the pawl 50 is normally in engagement with the ratchet 52, and therefore in order to provide for the movement of the pawl 50, also out of engagement with the ratchet teeth 52, each of the pawls 50 is also connected to the shaft 76, this connection being so arranged that the pawl 50 is moved out of operative relation to the ratchet teeth 52 before ratchet 36 is released by the pawl 70. This avoids movement of the pawls 50 out of engagement with the teeth 52 when they are under pressure from the load upon the frame or platform 24. The illustrated connections between the pawls 50 and the shaft 76 comprise links 96 each having at one end a pin and slot connection 98, 100, with one of the pawls 50, and at its other end being pivotally connected to an arm 102 attached to the shaft 76. The slot 100 provides for the normal operative movement of the pawl 50 when the parts are in the position shown in Fig. 6.

From the foregoing description it will be noted that the steering handle 22 is at all times connected to the pawl 50, and that by reason of the swivel connection between the lever 54 and the sliding rod 58, the pawls 50 receive the same movement from the steering handle 22 in all steering positions of said handle, this swivel connection being coaxial with the swivel 18. In order that the handle may be free to move vertically when it is used only for steering, without transmitting movement to the ratchets 36, the position of the slot 94 in the shaft 76 is so arranged with respect to the link connections between this shaft and the pawls 50, that the shaft 76 may be turned into position to move the pawls 50 out of operative relation to the ratchets 36 without bringing the slots 94 into releasing relation to the pawls 70. Thus the connection between the steering handle 22 and the elevating mechanism of the truck may be interrupted without releasing the load-carrying platform.

The illustrated means for rocking or turning the shaft 76 to effect in the proper order the movement of the pawls 50 out of operative relation to the ratchets 36, and the release of the retaining pawls 70, comprises a treadle lever 104 connected to an end of the rock shaft 76 which projects through the casing 4, this lever having an upper position shown in Fig. 4 in which the rock shaft 76 is maintained in the position shown in Fig. 6 of the drawings, and an intermediate position determined by the engagement of a dog 106 pivoted upon said lever with a pin 108 on the casing 4, said dog being yieldingly held in operative relation to said pin 108 by a spring 110, connected at one end to the dog and at its other end to the casing 4. In this intermediate position the parts are in the position shown in Fig. 8 of the drawings, in which the pawls 50 have been moved out of engagement with the ratchets 36, thus permitting free swinging movement of the handle 22 when it is used for steering, the retaining pawls 70 being held, however, in operative retaining position. The third position of the treadle lever 104 is its lowermost position, and in order to move it into this position the dog 106 must be moved out of engagement with the pin 108. In this lowermost position of the treadle lever, the parts inside the casing are in the position shown in Fig. 9, the shaft 76 being turned into releasing relation to the pawls 70. In the lowermost position of the treadle lever, the platform is thus permitted to descend, this descent being effected through gravity and being accelerated by the action of the spring 30. To retard somewhat the descent of the platform and prevent undue shock to the truck when lowering a heavy load, a dash-pot is provided, this dash-pot comprising a cylinder 112 pivotally connected to a cross rod 114 between the ratchets 36, and a piston (not shown) having a piston rod 116 pivotally connected at 118 to the upper part of the frame or casing 4.

To prevent or retard movement of the truck, when desired, a brake is provided, the illustrated brake comprising straps 120 cooperating with the steering wheels 8, these straps being connected at their upper ends to a cross-bar 122 upon the steering wheel support 16 and being bent at their lower ends at 124 to provide cam surfaces, which are arranged to be engaged by a brake-operating member 126 pivoted upon the steering handle 22 and extending to either side of said handle. A stop 128 limits the movement of the member 126 in one direction and when said member is in contact with the stop 128, it is in position to engage the cam 124 during the downward stroke of the handle 22, thus applying the brakes 120 to the steering wheels 8 and preventing movement of the truck. By swinging the member 126 away from the stop 128, it may be moved out of operative relation to the cam 124 and thus the handle may be swung freely without operating the brake.

What I claim as new is:—

1. In an elevating truck, a frame and supporting and steering wheels, a steering wheel support having a swivel connection with said frame, a steering handle pivoted upon said support, elevating mechanism arranged to be operated from said handle and comprising a member pivoted upon said frame, and a link having one end constantly connected to said member and its other end constantly connected to said handle, said link extending axially through said swivel.

2. In an elevating truck, the combination with a frame and supporting and steering wheels, of a steering handle, ratchet and pawl elevating mechanism on said frame arranged to be operated from said steering handle, said mechanism comprising operating and retaining pawls and a swivel in the operating connections to said handle, whereby said mechanism does not partake of the steering movements of said handle, and a single manually operated means having controlling connections for rendering both of said pawls operative or inoperative.

3. An elevating truck, comprising, in combination, a truck frame and supporting wheels, a steering handle arranged to swing vertically, elevating mechanism comprising a ratchet, an operating pawl and a retaining pawl co-operating with said ratchet, and a single means for rendering one or both of said pawls inoperative, and connections whereby said elevating mechanism may be operated from said steering handle.

4. An elevating truck, comprising, in combination, a truck frame and supporting and steering wheels, a steering handle having a steering wheel connection and arranged to swing vertically, elevating mechanism comprising a segmental ratchet fulcrumed on said frame, an operating pawl connected to said handle and a retaining pawl mounted on said frame, a swivel in the operating connections to said handle, whereby said mechanism does not partake of the steering movements of said handle, and a single controlling device having connections for rendering both of said pawls inoperative.

5. An elevating truck, comprising, in combination, a truck frame and supporting and steering wheels, a steering handle having a steering wheel connection and arranged to swing vertically, elevating mechanism comprising a movable ratchet, operating and retaining pawls co-operating with said ratchet, said operating pawl being constantly connected to said handle, a treadle and connections between said treadle and said pawls for rendering said pawls in succession inoperative with respect to said ratchet.

6. In an elevating truck, the combination with the truck frame and supporting and steering wheels, of a steering handle and elevating mechanism comprising a movable ratchet, operating and retaining pawls co-operating with said ratchet, and controlling means for said pawls arranged to render them inoperative in a predetermined succession.

7. In an elevating truck, the combination with the truck frame, of elevating mechanism comprising a movable ratchet, operating and retaining pawls cooperating with said ratchet, and a single controlling device operatively associated with each of said pawls, the connections between said pawls and said device being so arranged that by a single continuous movement said device may render first said operating pawl and then said retaining pawl inoperative.

8. In an elevating truck, the combination with the truck frame and supporting and steering wheels, of a steering handle, elevating mechanism mounted on said frame and comprising a jack member constantly connected to said steering handle, and a cooperating jack member, means on said truck for retaining said elevating mechanism in elevated condition, means arranged to be controlled by the operator for effecting a relative movement of said jack members into inoperative relation, and means associated with said operator-controlled means and operable upon a further movement of said means for rendering said retaining means inoperative.

9. In an elevating truck, the combination with the truck frame and supporting and steering wheels, of a steering wheel support swiveled in the front of said truck frame, a steering handle connected to said swivel to turn therewith and to swing vertically thereon, elevating mechanism upon said frame comprising a segmental ratchet, operating and retaining pawls cooperating with said ratchet, connections between said operating pawl and said handle having a joint coaxial with said swivel, and treadle controlled means for maintaining said retaining pawl in operative position having connections to said operating pawl for effecting the movement of said pawl into and out of operative relation to said ratchet.

10. In an elevating truck, the combination with the truck frame and supporting and steering wheels, of a steering handle, elevating mechanism mounted on said frame and comprising a jack member constantly connected to said steering handle and a cooperating jack member mounted on the frame, said steering handle connection comprising a swivel, whereby said mechanism does not partake of the steering movements of said handle, means on said truck for retaining said elevating mechanism in elevated condition, and treadle controlled means for effecting a relative movement of said jack members into inoperative relation.

11. In an elevating truck, the combination with a truck frame and supporting and steering wheels, of a steering handle, load elevating mechanism arranged to be operated from said handle and comprising means for retaining said load in elevated position when the operating connection to the handle is interrupted, and treadle operated means having connections for interrupting said handle connection and for releasing said retaining means.

12. In an elevating truck, the combination with a truck frame and supporting and steering wheels, of a steering handle, a load-carrying frame, mechanism for elevating said load-carrying frame arranged to be operated from said handle, said mechanism comprising an operating connection to said handle, means for retaining said frame in elevated position when said connection is broken, and a single manually operated means having controlling connections arranged to effect by successive movements of said means the disconnection of said handle from said elevating mechanism and the release of said retaining means.

13. In an elevating truck, the combination with a frame and supporting wheels, of elevating mechanism and means for operating said mechanism, a brake for one of the truck wheels, and means operable by the normal movement of the means for operating the elevating mechanism for applying said brake.

14. In a truck of the class described, the combination with a truck frame and supporting and steering wheels, of a pivoted steering handle having a steering wheel connection, a steering wheel brake and means carried by said handle and operated by the swinging movement thereof for applying said brake.

15. In an elevating truck, the combination with a truck frame and supporting and steering wheels, of a steering handle and ratchet and pawl elevating mechanism arranged to be operated from said handle, said mechanism comprising an operating pawl and a retaining pawl, a movable carrier upon which said retaining pawl is pivoted, and means cooperating with said pawl and carrier when said pawl is in operative engagement with the ratchet for preventing movement of said pawl upon or with its carrier.

16. In an elevating truck, the combination with a truck frame, supporting and steering wheels and a steering handle, of elevating mechanism comprising step-by-step lifting means arranged to be operated from said handle and automatically operating retaining means, and treadle operated means mounted on the frame and unconnected to said handle for interrupting and for restoring the operative connection between said lifting means and said handle.

17. In an elevating truck, the combination with a truck frame, supporting and steering wheels and a steering handle, of elevating mechanism comprising step by step lifting means arranged to be operated from said handle and automatically operating retaining means, and a treadle operatively associated with said lifting means and with said retaining means and adapted upon one movement thereof to interrupt the connection between the lifting means and the handle and upon another movement thereof to release said retaining means.

18. In an elevating truck, the combination with a truck frame, supporting and steering wheels and a steering handle, of elevating mechanism comprising step-by-step lifting means arranged to be operated from said handle and automatically operating retaining means, and treadle operated means for interrupting and for restoring the operative connection between said lifting means and said handle, said treadle operated means tending to remain in the position to which it is moved.

19. In a truck, the combination of a main frame, an elevating frame movable up and down relatively thereto, a lever adapted to swing both vertically and laterally relatively to said first-named frame, a short lever pivotally mounted on a horizontal axis on said main frame, and having its operative end portion positioned substantially at the vertical axis about which said first-named lever is adapted to swing, being adapted to be operated by said first-named lever in any adjusted angular position of the lever relative to the frames, and means actuated by said second lever for raising said elevating frame relative to said first-named frame.

20. A lifting truck comprising a wheeled frame, an elevating frame carried thereby, pawl and ratchet mechanism mounted on said wheeled frame for raising said elevating frame, and a steering lever adapted to operate said pawl and ratchet mechanism and arranged to swing laterally independently thereof meanwhile maintaining its operative relation thereto.

21. A lifting truck comprising a wheeled frame, an elevating frame mounted thereon to move longitudinally and vertically, a vertically swinging steering lever, a rocking lever mounted on said wheeled frame and adapted to be actuated by said steering lever, and means actuated by the rocking of said rocking lever for moving said elevating frame longitudinally and vertically, manually operated means for effecting a disconnection when desired between said rocking lever and the means actuated thereby so as to permit up and down movement of said steering lever for steering said truck, said steering lever being arranged to swing laterally independently of said rocking lever meanwhile maintaining its operative relation thereto.

22. A lifting truck comprising a main frame having supporting and steering wheels, a lifting frame mounted on said main frame, a steering handle connected with the steering wheel, a rocking member mounted on said main frame, and means operatively connecting said rocking member with said lifting frame whereby said lifting frame may be raised or lowered by rocking said rocking member, a latch co-operating with said rocking member for holding said lifting frame in its elevated position, and means operated by said steering handle in its different steering positions for rocking said rocking member.

23. In a truck, the combination of a main frame, an elevating frame carried thereby, a rotary member mounted on said main frame, for raising said elevating frame, pawl and ratchet mechanism for operating said rotary member, and a lever adapted to be swung laterally independently of said pawl and ratchet mechanism and arranged to maintain its operative relation thereto in whatever angular position the lever may stand.

24. In a truck, the combination of a main frame, an elevating frame carried thereby, a rotary member mounted on said main frame for raising said elevating frame, pawl and ratchet mechanism for operating said rotary member a lever adapted to be swung laterally independently of said pawl and ratchet mechanism and arranged to maintain its operative relation thereto in whatever angular position the lever may stand, and a holding pawl adapted to cooperate with said ratchet mechanism for permitting successive operative strokes of said lever.

25. In a truck, the combination of a main frame, an elevating frame carried thereby, a rotary member mounted on said main frame, for raising said elevating frame, a pawl and ratchet mechanism for operating said rotary member, a lever adapted to be swung laterally independently of said pawl and ratchet mechanism and arranged to maintain its operative relation thereto in whatever angular position the lever may stand, a holding pawl adapted to cooperate with said ratchet mechanism for permitting successive operative strokes of said lever, and means for moving both of said pawls out of operative position.

26. In a truck, the combination of a main frame, an elevating frame carried thereby, a rotary member mounted on said main frame for raising said elevating frame, pawl and ratchet mechanism for operating said rotary member, a lever adapted to be swung laterally independently of said pawl and ratchet mechanism and arranged to maintain its operative relation thereto in whatever angular position the lever may stand, a holding pawl adapted to cooperate with said ratchet mechanism for permitting successive operative strokes of said lever, and means for moving said pawls in succession out of operative position.

27. In a truck, the combination of a main frame, an elevating frame carried thereby, a rotary member mounted on said main frame for raising said elevating frame, pawl and ratchet mechanism for operating said rotary member, a lever adapted to be swung laterally, independently of said pawl and ratchet mechanism and arranged to maintain its operative relation thereto in whatever angular position the lever may stand, a holding pawl adapted to cooperate with said ratchet mechanism for permitting successive operative strokes of said lever, and means for first moving said operative pawl out of operative position and then moving said holding pawl out of operative position.

28. In a truck, the combination of a frame, an elevating frame, carried thereby, a rotary member for raising said elevating frame, a pawl and ratchet mechanism for operating said rotary member, a lever adapted to be swung laterally independently of said pawl and ratchet mechanism and arranged to maintain its operative relation thereto in whatever angular position the lever may stand, a holding pawl adapted to cooperate with said ratchet mechanism for permitting successive operative strokes of said lever, a foot lever and means operating by a partial downward stroke thereof, to throw said operating pawl out of operative position and thereafter by a continued downward stroke thereof to throw said holding pawl out of operative position.

29. In a lifting truck, a lifting frame, steering and supporting wheels therefor, a steering head for said truck swivelled to turn on a vertical axis and carrying said steering wheel with it in its turning movement, a steering handle connected to said steering head to turn the same on its vertical axis, said handle being pivoted thereon for swinging in a vertical plane, means operable by the vertical swinging movement of said steering handle when in any steering position to elevate said lifting frame in a step by step manner, comprising a member extending axially through said swivelled head so as to permit relative sliding movement between said head and said member along the vertical axis of said steering head, a power transmitting lever pivoted on said truck to swing on a horizontal axis, and having a portion coacting with the end of said axially extending member in effecting the elevation of said lifting frame.

30. In a lifting truck, a lifting frame, steering and supporting wheels therefor, a steering head for said truck swivelled to turn on a vertical axis and carrying said steering wheel with it in its turning movement, a steering handle connected to said steering head to turn the same on its vertical axis, said handle being pivoted thereon for swinging in a vertical plane, pawl and ratchet mechanism operable by the vertical swinging movement of said steering handle when in any steering position to elevate said lifting frame in a step by step manner, comprising a member extending axially through said swivel steering head so as to permit relative sliding movement between said head and said member along the vertical axis of said steering head, and a power transmitting lever pivoted on said truck to swing on a horizontal axis and having a portion coacting with the end of said axially extending member in effecting the elevation of said lifting frame, and manually controlled means to disconnect the pawl and ratchet mechanism from operation by said handle so as to permit free up and down movement of said handle when steering said truck.

Signed at Holyoke, Mass., this 7th day of March, 1917.

DANIEL E. HENNESSY.

Witnesses:
C. T. NEAL,
H. M. TAYLOR.